United States Patent Office 2,750,370
Patented June 12, 1956

2,750,370

9-OXODEHYDROABIETYL ALCOHOL AND PROCESS OF PREPARATION

Lee A. Subluskey, Wilmington, Del., assignor to Hercules Powder Company, Wilmington, Del., a corporation of Delaware No Drawing. Application May 5, 1955, Serial No. 506,375

2 Claims. (Cl. 260—99)

The present invention relates to a novel compound derivable from dehydroabietic acid.

In copending application Serial No. 325,902, filed December 13, 1952, by T. F. Sanderson, there is described the novel compound 9-hydroxydehydroabietyl alcohol which is obtainable by the reduction of an ester of 9-oxodehydroabietic acid.

In accordance with the present invention, it has been found that 9-hydroxydehydroabietyl alcohol can be oxidized by means of an aluminum alkoxide in the presence of a ketone as a hydrogen acceptor whereby the hydroxy group in the 9 position is oxidized to an oxo radical to produce the new and useful compound 9-oxodehydroabietyl alcohol.

The following example is presented as illustrative of the invention. All parts and percentages are by weight unless otherwise specified.

*Example*

In a reaction vessel equipped with a reflux condenser there was placed 6 parts of 9-hydroxydehydroabietyl alcohol dissolved in 135 parts of acetone. To this solution there was then added 6 parts of aluminum isopropoxide in approximately 154 parts of benzene. The resulting reaction mixture was refluxed for approximately 16 hours. A 5% sulfuric acid solution was then added until two clear phases were obtained. Both phases were extracted with 500 parts of ether. The ether extract was washed twice with a 2% aqueous sodium hydroxide solution and then washed with water until the washings were neutral. Evaporation of the ether solution yielded a thick oil which crystallized upon standing. Recrystallization from hexane yielded 4.3 parts of a crystalline product melting at 87.5–88° C. This product was identified as 9-oxodehydroabietyl alcohol. *Analysis.*—Calculated for $C_{20}H_{28}O_2$: C, 79.96; H, 9.53. Found: C, 79.68; H, 9.58.

As illustrated in the example, the process of the invention comprises oxidizing 9-hydroxydehydroabietyl alcohol by means of an aluminum alkoxide in the presence of a ketone as a hydrogen acceptor. As can be seen, the reaction is selective to the oxidation of the hydroxyl group attached to the secondary carbon atom, the hydroxyl group attached to the primary carbon atom being unattacked. The reaction is preferably carried out by refluxing the ingredients in an aromatic hydrocarbon solvent, such as benzene or toluene, or an aliphatic hydrocarbon solvent, such as hexane, which is inert in the reaction. The aluminum alkoxides which are useful in the process are aluminum isopropoxide and aluminum t-butoxide. The ketones which are preferred as hydrogen acceptors are acetone and cyclohexanone.

Although theoretically only a relatively small amount of aluminum alkoxide is required for the reaction, it is recommended that at least 0.25 mole of alkoxide per mole of 9-hydroxydehydroabietyl alcohol be employed. Best results are obtained when 1–3 moles of aluminum alkoxide per mole of alcohol is used.

The amount of ketone to be used can be widely varied but it is preferable to have present at least 50 moles of ketone for each mole of 9-hydroxydehydroabietyl alcohol. A practical range is 50–200 moles of ketone per mole of alcohol.

The time of the reaction is quite variable and is dependent upon the reaction temperature, the higher the temperature, the shorter the reaction time. When benzene is used as a solvent, about 4–24 hours are required at the reflux temperature. With higher boiling solvents, shorter times are possible.

As shown in the example, the desired reaction product can be conveniently isolated from the reaction mixture by adding dilute sulfuric acid until two clear phases are obtained and then extracting with ether.

The compound of the invention possesses a variety of interesting uses in chemical syntheses. For example, it behaves both as a primary alcohol and a ketone and thus is a desirable intermediate for the preparation of esters and other compounds.

It is also a desirable ingredient in adhesive compositions and is further useful as a reactive modifier in the preparation of alkyd and polyester resins. The polyesters prepared from the compound are particularly valuable ingredients of nitrocellulose lacquers as is shown in the following illustration:

A mixture consisting of 60 parts of 9-oxodehydroabietyl alcohol, 20 parts of maleic anhydride and 6 parts of ethylene glycol was heated at 220° C. in an atmosphere of carbon dioxide for six hours in a vessel equipped with a stirrer. At the end of this time the acid number of the reaction mixture was 9.2. This polyester was then incorporated into a typical nitrocellulose lacquer (43 parts polyester, 43 parts nitrocellulose ½ sec. R. S., 14 parts dibutyl phthalate, 50 parts toluene, 20 parts butyl acetate, 10 parts ethyl acetate, 10 parts ethyl alcohol, and 10 parts butyl alcohol) and evaluated against two control lacquers which has as their respective resin components similar polyesters prepared from dehydroabietyl alcohol and from a commercial mixture of dehydro-, dihydro- and tetrahydroabietyl alcohols. In durability and light stability tests, the lacquer employing the 9-oxodehydroabietyl alcohol resin was greatly superior to the controls. This shows lack of the slow oxidative degradation that is generally accepted as being responsible for poor durability and coloring of lacquer vehicles, which have as their resin component rosin-derived materials.

What I claim and desire to protect by Letters Patent is:
1. 9-oxodehydroabietyl alcohol.
2. A process of preparing 9-oxodehydroabietyl alcohol which comprises oxidizing 9-hydroxydehydroabietyl alcohol by means of an aluminum alkoxide in the presence of a ketone selected from the group consisting of acetone and cyclohexanone as a hydrogen acceptor.

References Cited in the file of this patent

UNITED STATES PATENTS

| | | |
|---|---|---|
| 2,656,345 | Jacobsen | Oct. 20, 1953 |
| 2,704,283 | Jacobsen | Mar. 15, 1955 |

OTHER REFERENCES

Helv. Chim. Acta, vol. 33, pp. 1730–32.